United States Patent [19]

Jacquemet

[11] Patent Number: 4,468,594

[45] Date of Patent: Aug. 28, 1984

[54] ELECTROMAGNETIC PERCUSSION IMPLEMENT

[75] Inventor: Georges Jacquemet, Caluire, France

[73] Assignee: Martelec Société Civile Particulière, Caluire, France

[21] Appl. No.: 423,082

[22] Filed: Sep. 24, 1982

[30] Foreign Application Priority Data

Oct. 2, 1981 [FR] France ............................... 81 19118

[51] Int. Cl.³ ............................................ H02P 33/00

[52] U.S. Cl. .................................... 318/130; 318/125; 318/126; 318/127; 318/128; 310/30; 310/23; 173/91

[58] Field of Search ............... 318/114, 125, 126, 127, 318/128, 129, 130, 133; 310/14, 23, 29, 30, 32, 34, 35, 36; 173/53-166

[56] References Cited

U.S. PATENT DOCUMENTS

| | | | |
|---|---|---|---|
| 1,753,454 | 4/1930 | Weyandt | 310/30 |
| 2,241,364 | 5/1941 | Hulbert | 310/30 |
| 2,803,761 | 8/1957 | Young | 310/23 X |
| 3,681,629 | 8/1972 | Drye | 310/30 X |
| 4,215,297 | 7/1980 | Jacquemet | 310/30 X |

FOREIGN PATENT DOCUMENTS

| | | |
|---|---|---|
| 25277 | 1/1923 | France . |
| 1107275 | 12/1955 | France . |
| 1125853 | 9/1968 | United Kingdom . |

*Primary Examiner*—G. Z. Rubinson
*Assistant Examiner*—Paul Shik Luen Ip
*Attorney, Agent, or Firm*—Karl F. Ross; Herbert Dubno

[57] ABSTRACT

A two-directional percussion implement selectively adaptable both for driving in and for extracting, e.g. piles, from the ground, includes two coaxial electromagnetic coils whose movable armatures are represented by extremities of a reciprocable ram. Opposite anvils, one of which is adapted to be coupled with a driven element, are interlinked by a non-magnetic shaft traversing the ram. When the implement is intended for drilling operations, a rotary drive imparts rotation to one of the anvils via a connection permitting independent rotation and reciprocation. The shaft in this case has a central channel for taking samples or for conducting drilling fluids. When adapted only for axial percussions, the implement is vertically suspended on a cable via a shock absorber.

11 Claims, 5 Drawing Figures

ELECTROMAGNETIC PERCUSSION IMPLEMENT

FIELD OF THE INVENTION

My present invention relates to an electromagnetic percussion implement and, in particular, to a two-directional apparatus of this kind selectively adaptable for driving in or for extracting from the ground elongate elements, such as piles, tubes, planks or sheet pilings, rods etc., and also for drilling holes for civil engineering purposes or in mines. More particularly the invention relates to an electromagnetic hammer/extractor.

BACKGROUND OF THE INVENTION

In order to extract a pile from the ground, it is desirable to accompany a traction force applied to the pile with percussions facilitating the removal of the pile. Similarly, in driving a pile into the ground the best results can be obtained when the energy of percussion transmitted to a pile consists of two components one of which provides vibrations while another forces the pile into the ground.

Various mechanical, hydraulic and pneumatic instruments have been designed to this end. Mechanical equipment is rather complex and ordinarily is subjected to much damage. On the other hand, fluid-pressure apparatus can hardly be operated when ambient temperature becomes very low.

My U.S. Pat. No. 4,215,297 describes an electromagnetic percussion appliance wherein a reciprocable non-magnetic ram is coupled with an armature of an electromagnetic coil constituting an electromagnetic hammer adapted mostly for one-directional operation.

Two-directional conventional implements adapted both for driving and for extracting operations, in many instances, have to be reassembled or turned upside-down on changeable supports, in order to switch them from one operation to another.

OBJECT OF THE INVENTION

The principal object of my present invention is, therefore, to provide an improved two-directional electromagnetic percussion implement reliably operating even at low ambient temperatures, and having the simplest possible structure for providing percussions in both directions.

SUMMARY OF THE INVENTION

These and other objects are attained in a percussion implement wherein according to the invention an axially reciprocable ram constitutes movable armatures of two coaxial electromagnetic coils which are spaced along the longitudinal axis relative each other and intermittently energized by a controlled electric supply.

In striking cooperation with opposite extremities of the ram, two anvils are mounted, the anvils being interlinked for associated motion under percussions of the ram. Each anvil has an adjacent fixed bumper limiting its axial motion when the other anvil is stricken by the ram.

Upon the energization of one or the other coil, one of the anvils adapted to be coupled with a driven element, can be selectively used for driving this element, e.g. a pile, in the ground or for extracting the same from the ground in the same operational position of the implement according to the invention.

Advantageously, the ram is movably traversed by a shaft of non-magnetic material interlinking the anvils and permitting their associated reciprocation and rotation.

Rotation is imparted to one or both of the anvils, when the implement is intended to be used for drilling wells, holes or the like. To this end, at least one of the anvils is operatively connected with a rotary drive, which, according to one variant of my invention, is coaxially mounted with the anvils and connected with one of them, while the other imparts rotation via the linking shaft and transmits it, e.g. to a driven tool.

According to another modification of the invention, the anvil connectable with the drilling tool is directly driven by a laterally mounted drive via a connection including two sprocket pinions coupled by an endless chain.

It is desirable in some processes for taking samples from the ground or for conducting drilling fluids, to provide a channel within the linking shaft and in the anvils, the channel having opposite ports accessible from outside. The drilling process can advantageously be carried out in combination with the axial percussions caused by the electromagnetic hammers, wherefor these connections of the rotary drive should permit independent and simultaneous reciprocation and rotation of the anvils.

According to another feature of my invention, the implement, when it should not be used for rotary drilling, is vertically suspended on a cable, In such a case one of the anvils, ordinarily an upper one, is normally supported in direct contact with a respective bumper, while the other, lower anvil is adapted to cooperate with a pile, a tool or with another driving element.

Advantageously, the upper anvil can further be provided with laterally projecting lugs supported on tie-rods of electrical jacks which are mounted on a housing of the implement.

In order to prevent propagation of vibration developed in use of the implement from the anvils to the cable, a damper or shock absorber constituted by a spring or a block of elastic material, is interposed between the cable and the housing of the implement or, otherwise, between the lugs and the tie-rods.

BRIEF DESCRIPTION OF THE DRAWINGS

The above and other objects, features and advantages of my present invention will become more readily apparent from the following description with reference to the accompanying drawing in which.

SPECIFIC DESCRIPTION

Figure 1:
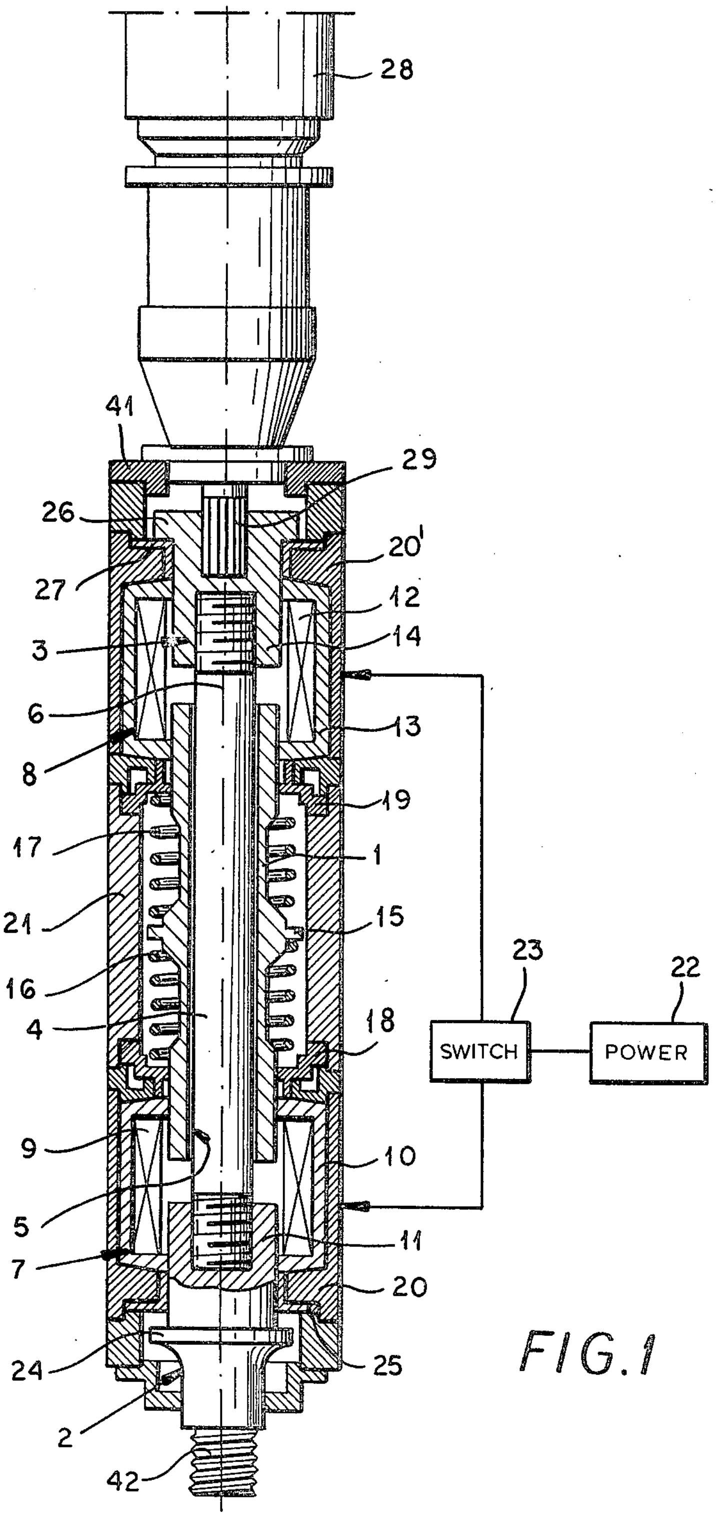
FIG. 1 is a longitudinal sectional view of the electromagnetic percussion implement for two-directional action, according to the invention, with a rotary drive mounted coaxially with a double-acting electromagnetic hammer.

The electromagnetic percussion implement shown in FIG. 1 comprises a reciprocable ram 1 whose lower end is adapted to strike a lower anvil 2, when the implement is used as a perforator, and whose upper end is cooperating with a respective upper anvil 3, when the implement is used as an extractor. The anvils 2 and 3 are interlinked by a shaft 4 of non-magnetic material, traversing an axial central channel 5 in the ram 1. The ram 1 reciprocally cooperates with two electromagnetic hammers 7 and 8 arranged coaxially along a central longitudinal axis 6, each hammer being designed according to French Pat. No. 2,430,827 (see also U.S. Pat. No. 4,215,297).

The lower hammer 7 has an electromagnetic coil 9 mounted in a casing 10; the lower anvil 2 of this hammer has its cylindrical portion 11 received into the coil 9. The lower extremity of the ram 1 constitues a movable armature of the coil 9 and is also received therein.

Symmetrically, the upper hammer 8 includes an upper electromagnetic coil 12 accommodated in a casing 13 and having its movable armature constituted by a respective upper extremity of the same ram 1. The upper anvil 3 of this hammer 8 has a cylindrical portion 14 introduced into the coil 12.

In its intermediate portion, the ram 1 is provided with a collar 15 whose opposite sides are supported by two counteracting helical springs 16 and 17 mounted around the ram 1 and compressed against respective partitions 18 and 19. The ram normally is suspended in a floating intermediate position by these springs 16 and 17. The entire arrangement of two electromagnetic hammers 7 and 8 is assembled between two end cases 20 and 20′ within a central housing 21. In operation, the assembly is to be mounted on an external support (not shown), e.g. on a slider equipped with necessary mounting and adjusting mechanisms.

Both these electromagnetic hammers 7 and 8 are connected in a common electric circuit of supply and control which is diagrammatically shown as a block 22; this circuit is designed according to French Pat. No. 2,356,483 and to French patent of addition No. 2,425,302, see also U.S. Pat. No. 4,215,297. The circuit 22 of the electric power supply is connected to a switch 23 by which an operator can selectively energize the coil 9 or the coil 12.

When the implement is to be used for driving a pile into the ground, the switch 23 is positioned to energize the coil 9 of the lower electromagnetic hammer 7, whereby the lower end of the rim 1 is forced down overcoming the equilibrium caused by the springs 16 and 17. The ram 1 strikes the cylindrical portion 11 of the lower anvil 2 whose collar 24 is taken up and abuts a limiting bumper 25. The lower anvil 2 transmits kinetic energy received from the ram 1 to the pile or to a working tool (not shown) which can be fixed on a lower end of the anvil 2.

In the same working position the implement can be used for extracting piles from the ground; to this end, the operator turns the switch 23 for energizing the coil 12 of the electromagnetic hammer 8. With every electric pulse supplied to the coil 12, the upper extremity of the ram 1 strikes the cylindrical portion 14 of the upper anvil 3 whose collar 26 abuts a respective bumper 27. The anvil 3 transmits kinetic energy to the anvil 2 through the linking shaft 4.

The length of the shaft 4 between the anvils 2 and 3 is selected such as to protect the upper anvil 3 from the action of back blows caused during the percussions of the ram 1 against the lower anvil 2. In the same way, during the extraction, the lower anvil 2 is but slightly affected by back blows caused by the percussions of the ram 1 under the action of the hammer 8.

According to one modification of the implement illustrated in FIG. 1, an entrainment into rotation of a pile or of a tool to be driven, is obtained by a rotary drive 28 mounted above the double-acting electromagnetic hammer 7, 8 along the axis 6 thereof. The drive is a combination of a conventional motor and a reducer whose output shaft 29 is rotatively connected with the upper anvil by a splined end allowing axial displacements of the anvil 3 independently of the rotation. Via the linking shaft 4 the rotation is transmitted from the anvil 3 to the anvil 2 which is adapted to rotate a tool.

Figure 2:
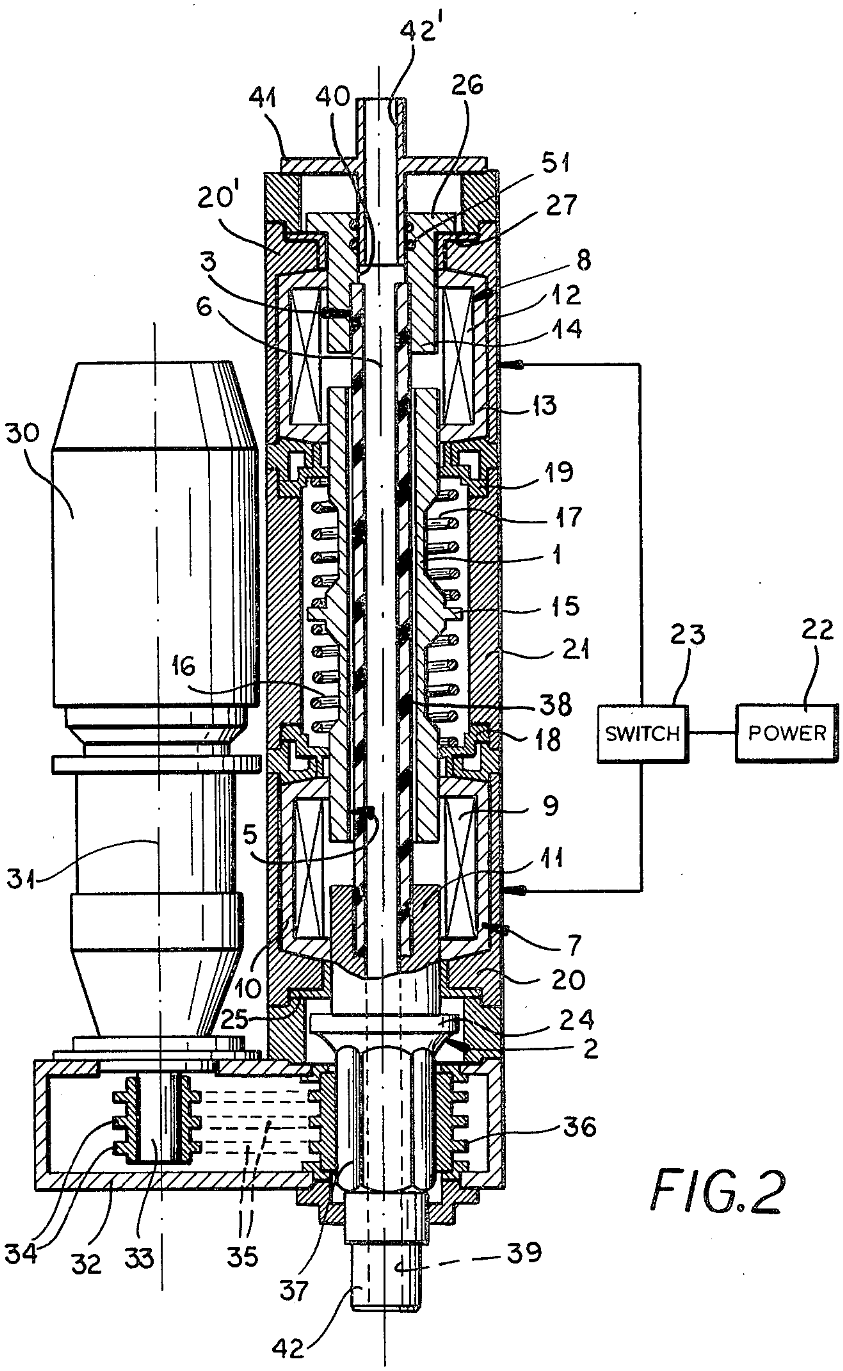
FIG. 2 is a longitudinal sectional view of a modification of the implement with a laterally mounted rotary drive.

FIG. 2 shows another modification of the implement wherein the rotary drive 30 including a motor and a reducer is laterally mounted with respect to the anvils 2 and 3. An output shaft 33 of the drive carries a driving sprocket pinion 34 connected via an endless chain 35 with a driven sprocket pinion 36 having an axial hexahedral cavity (hex socket) receiving a mating hexahedral shank 37 of the lower anvil 2. This transmission is arranged in a casing 32 supporting the drive 30 whose axis 31 is parallel to the axis 6 of the implement. The chain transmission does not impair the axial motion of the anvils during the rotation.

FIG. 2 further shows the interlinking shaft 4 constituted by a tube 38 coaxially mounted with the anvils 2 and 3 and sealingly received in their axial channels 39 and 40, respectively. In the upper cover 41 of the housing, along the axis 6, a port 42 is provided intended for taking samples of a rock through the channels of the anvils and through the tube 38 or for conducting drilling fluids therethrough. Sealing rings 51 are provided in the channel 40.

A lower projection 42 of the lower anvil 2 can be provided with an adapter, e.g. a threaded head or with a chuck, for coupling with a tool or with an element to be driven into the ground. The particular type of adapter will, of course, depend on specifics of the tools to be used and rotation to be applied.

Figure 3:
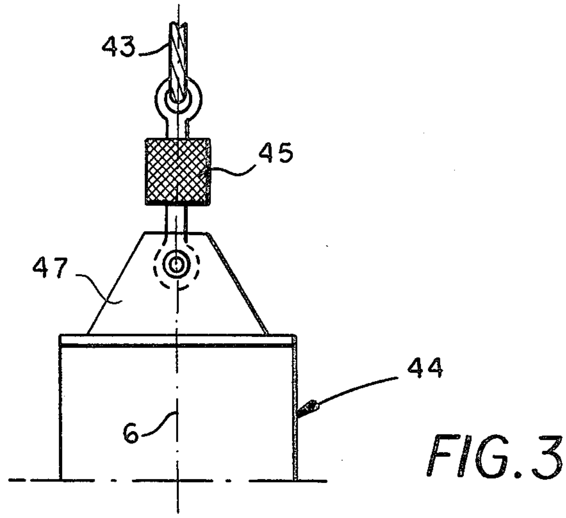
FIG. 3 represents a side view of an upper part of the implement, according to the invention, suspended on a cable.

In many instances, when the implement according to the invention should not perform any drilling or rotary operations, it can be suspended by a cable 43 (FIG. 3) on a crane; in order to prevent the propagation of vibrations from the anvils of the implement to the cable 43, a shock absorber 45 is interposed between an upper bracket 47 of an upper part of the housing 44 and the cable 43.

When the housing 44 is suspended so that in an initial position the lower anvil 2 is supported on the lower bumper 25, the implement is adapted for driving a pile in the ground; wherein, when the upper anvil 3 is initially supported on the respective upper bumper 27, the implement is ready for the extraction of the pile from the ground.

Figure 4:
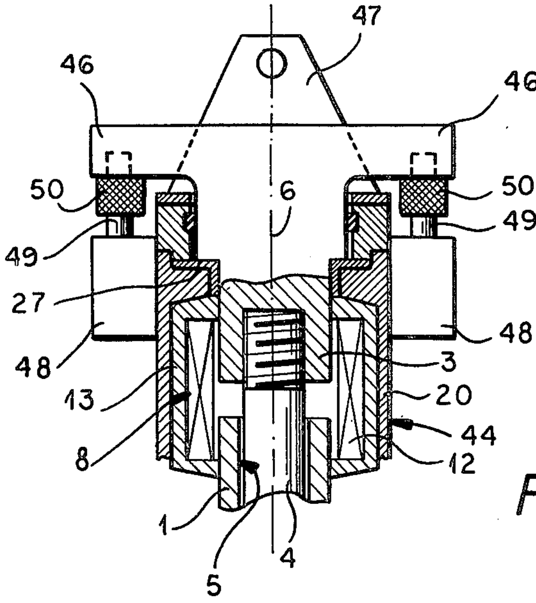
FIG. 4 is a partly sectional side view of a modification of the upper part shown in FIG. 3.
Figure 5:
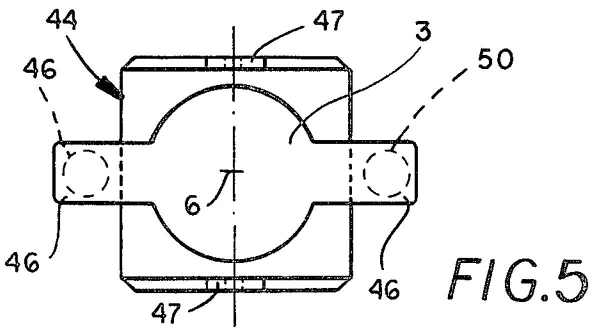
FIG. 5 is a plan view of the upper part of the implement of FIG. 4.

In a modification of my invention shown in FIGS. 4 and 5, the upper anvil 3 is provided with two laterally projecting lugs 46 which are supported outside of the housing 44 between two suspending brackets 47 on respective tie-rods 49 of two small size electrical jacks 48 whose cases are secured at opposite sides of the housing 44.

By using the jacks 48 either one or the other anvil of the implement can be initially supported by a respective bumper 25 or 27, to carry out percussions in downward or in upward direction.

To avoid affecting the cable by vibrations developed in the implement in operation, a shock absorber 50 is inserted between each tie-rod 49 and the respective lug 46.

The shock absorbers 45, 50 can be rubber blocks, springs or any other suitable conventional devices capable in any particular case to damp oscillations provided by the anvils.

I claim:

1. A percussion implement comprising:
   a housing;
   two coaxial electromagnetic coils fixed in said housing in spaced relationship relative to each other;
   a ram reciprocable between said coils coaxially therewith, said ram constituting movable armatures for said coils;
   restoring means normally suspending said ram in an intermediate position between said coils;
   two anvils mounted in said housing at opposite sides of said ram in striking cooperation therewith, said anvils being interlinked for associated motion under percussions caused by said ram;
   bumpers fixed in said housing to limit axial displacements of said anvils in opposite directions; and
   controlled electric supply means selectively energizing said coils to displace said ram unidirectionally against the force of said restoring means, whereby, depending on the energization of one or another of said coils, one of said anvils is subjected to percussions in a respective axial direction.

2. An implement as defined in claim 1 wherein said ram is movably traversed by a shaft of non-magnetic material interlinking said anvils.

3. An implement as defined in claim 2 wherein said anvils have cylindrical portions received in respective coils and shoulders engageable with respective ones of said bumpers at opposite ends of said housing, said ram having an intermediate collar supported at opposite sides by coaxial coil springs traversed by said ram.

4. An implement as defined in claim 2 wherein at least one of said anvils is operatively connected with a rotary drive for rotation independently of the reciprocation of said anvils.

5. An implement as defined in claim 4 wherein a first of said anvils is adapted to cooperate with a driven element, while a second anvil is coupled by an axially adjustable splined joint with said rotary drive mounted on said housing coaxially with said anvils, said linking shaft being adapted to impart rotation from said second anvil to said first one.

6. An implement as defined in claim 4 wherein said rotary drive is mounted on said housing laterally of said anvils, said drive being coupled with one of said anvils by an endless chain cooperating with two sprocket-pinions fixed on said drive and in said one of said anvils, respectively.

7. An implement as defined in claim 5 wherein said linking shaft and said anvils have an axial channel terminating in respective opposite ports accessible from outside.

8. An implement as defined in claim 1 wherein said housing is suspended on a cable, an upper one of said anvils being normally supported in contact with an upper one of said bumpers, while a lower one of said anvils is adapted for cooperation with a driven element and initially axially spaced from a lower one of said bumpers.

9. An implement as defined in claim 8 wherein said upper anvil has laterally projecting lugs supported on tie-rods of electrical jacks secured on said housing.

10. An implement as defined in claim 8 wherein said cable is connected to a top of said housing via a damping element.

11. An implement as defined in claim 9 wherein damping elements are inserted between said tie-rods and respective lugs.

* * * * *